United States Patent [19]

Coffman et al.

[11] 3,925,223

[45] Dec. 9, 1975

[54] HYDRAULIC FLUIDS BASED ON BORATE ESTERS

[75] Inventors: Robert L. Coffman, Mahopac; Richard W. Shiffler, Briarcliff Manor, both of N.Y.

[73] Assignee: Union Carbide Corporation, New York, N.Y.

[22] Filed: July 19, 1974

[21] Appl. No.: 489,890

[52] U.S. Cl. .............................. 252/78; 260/462 R
[51] Int. Cl.² .. C09K 3/00; C10M 3/20; C10M 3/48
[58] Field of Search .......... 252/78, 49.6; 260/462 R

[56] References Cited
UNITED STATES PATENTS

| | | | |
|---|---|---|---|
| 2,255,515 | 9/1941 | Popper | 252/78 X |
| 3,080,412 | 3/1963 | Young | 260/462 R |
| 3,316,287 | 4/1967 | Nunn et al. | 260/462 R |
| 3,625,899 | 12/1971 | Sawyer et al. | 252/78 x |
| 3,635,825 | 1/1972 | Sawyer et al. | 252/78 X |
| 3,637,794 | 1/1972 | Sawyer et al. | 252/78 X |
| 3,711,410 | 1/1973 | Sawyer et al. | 252/78 |
| 3,711,411 | 1/1973 | Sawyer et al. | 252/78 |
| 3,711,412 | 1/1973 | Sawyer et al. | 252/78 |
| 3,729,497 | 4/1973 | Sawyer et al. | 260/462 R |

FOREIGN PATENTS OR APPLICATIONS

| | | |
|---|---|---|
| 2,257,546 | 8/1973 | Germany |
| 2,165,875 | 8/1973 | France |

*Primary Examiner*—harris A. Pitlick
*Attorney, Agent, or Firm*—Bernard Francis Crowe

[57] ABSTRACT

Hydraulic fluids having improved wet equilibrium boiling points and rubber swell have been formulated from mixed glycol ether-glycol boric acid esters.

6 Claims, No Drawings

HYDRAULIC FLUIDS BASED ON BORATE ESTERS

BACKGROUND OF THE INVENTION

This invention pertains to hydraulic fluids which maintain high wet equilibrium boiling points on exposure to or contamination with moisture.

Hydaulic fluids are subject to moisture contamination which may arise because of the inherent hygroscopicity of the hydraulic fluid, from condensation of moisture from the air, or from physical leakage or defects in the hydraulic system which permits water to enter. The deleterious effects arising from moisture contamination of hydraulic fluids include lowering of boiling points, vapor locking, corrosion, hydrolysis, foaming, sludging, freezing, and the like.

The use of non-petroleum types of materials as hydraulic fluids was initiated because of the need for compatibility with the natural rubber and synthetic rubber seals used in hydraulic systems, such as for example, in hydraulic cylinders used in automotive brake systems. These materials being hygroscopic absorb moisture from the atmosphere which results in a lowering of the boiling points of the hydraulic fluids. The boiling points of these fluids render them less safe in hydraulic applications. The requirements of the United States National Highway Safety Bureau were published in the Federal Register, Vol. 35, No. 190, Sept. 30, 1970 wherein a method is outlined for measuring the wet equilibrium reflux boiling point (ERBP). The National Highway Safety Bureau has proposed amending the existing standards in order to provide more stringent requirements for the physical and chemical properties of brake fluids in particular. The proposed amendment which would restrict the manufacture of motor vehicle brake fluids to two specific grades, viz., DOT 3 and DOT 4 (DOT referring to the Department of Transportation), which became effective on Mar. 1, 1972.

It is therefore an object of this invention to provide hydraulic fluids which have high wet equilibrium reflux boiling points.

It is a further object to provide hydraulic fluids whose effects on rubber meets the requirements of Federal Motor Vehicle Safety Standard No. 116 (34 F.R. 113).

SUMMARY OF THE INVENTION

Hydraulic fluids which resist the deleterious effects of moisture contamination are provided by a mixture consisting essentially of:

1. about 2 to 100% by weight of a boric acid ester having the formula:

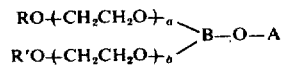

wherein each of $a$ and $b$ is an integer having values of 2 to 4, each of R and R' is an alkyl group having 1 to 4 carbon atoms, A is an oxyalkylene unit, including mixed oxyalkylene units having the formula:

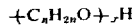

wherein $x$ is an integer having values of 1 to 5 and $n$ is an integer having values of 2 to 5;

2. 0 to about 62% by weight of a monoalkoxy trialkylene glycol having the formula:

wherein R''' is an alkyl group having 1 to 4 carbon atoms and R'' is hydrogen or methyl; and 3. 0 to about 36% by weight of a monoalkyl ether of diethylene glycol wherein the alkyl group contains 1 to about 4 carbon atoms.

DESCRIPTION OF THE INVENTION

The boric acid esters of this invention can be prepared by methods well known in the art by the interaction of boric acid with a monoglycol ether and a glycol in the presence of an inert, water azeotroping solvent with means for removing and measuring the water of condensation.

Suitable monoglycol ethers useful for synthesizing these boric acid esters include methoxy, ethoxy, propoxy and butoxy monoethers of diethylene glycol, triethylene glycol, tetraethylene glycol and the like.

Suitable glycol precursors which can be used for synthesizing these boric acid esters include ethylene glycol, diethylene glycol, triethylene glycol, tetraethylene glycol, pentaethylene glycol, ethylene-propylene glycol, diethylene-propylene glycol, diethylene-dipropylene glycol, triethylene-propylene glycol, tetraethylene-propylene glycol, and the like.

A unique and unexpected feature of this invention is that by choosing a structure for the boric acid ester where one organic moiety terminates in a free hydroxyl group rather than in an alkoxy group a minimum amount of rubber swell results when standard styrene-butadiene rubber cups are exposed to the respective ester. Such a balance of ester groupings thus permits one to obtain a boric acid ester whose viscosity is not inordinately high, as is the case where say three moles of glycol are esterified with boric acid and does not exhibit high rubber swell characteristics as in the case where three moles of an monoalkyl glycol ether are esterified with boric acid.

It is preferred in the formulation of the hydraulic fluids of this invention to use about 30% to 60% by weight of boric acid ester based on the weight of the total composition, although amounts above and below this range can be used if desired.

Suitable monoalkoxy trialkylene glycols for use in this invention include methoxy triethylene glycol, ethoxy triethylene glycol, propoxy triethylene glycol, butoxy triethylene glycol, methoxy tripropylene glycol, ethoxy tripropylene glycol, propoxy tripropylene glycol, butoxy tripropylene glycol, methoxy diethylene tripropylene glycol, ethoxy diethylene propylene glycol, methoxy ethylene dipropylene glycol, ethoxy ethylene dipropylene glycol, and the like.

Exemplary monoalkyl ethers of diethylene glycol include methoxy diethylene glycol, ethoxy diethylene glycol, propoxy diethylene glycol, butoxy diethylene glycol, isopropoxy diethylene glycol, isobutoxy diethylene glycol, and the like.

Known hydraulic fluid additives can be used up to concentrations of about 5% by weight based on the total combined weight of components. Representative anti-oxidants which can be used include aromatic amines, as for example, phenyl alpha-naphthyl amine, phenyl beta napthylamine, phenothiazine, 3,7-dioctylphenothiazine, polymerized trimethyl dihydroquinoline (AGE Rite Resin D) and the like, as well as phenolic compounds such as 2,6-di-t-butyl-para-cresol, 2,4-dimethyl-6-t-butyl phenol, 2,6-bis(2'-hydroxy-3-t-butyl-5'-methylbenzyl)-4-methyl-phenol, and the like.

Suitable corrosion inhibitors can be used alone and/or in combination, if desired, as for example borax, dialkylamines, such as, dipropylamine, dibutylamine, dipentylamine, dihexylamine, and the like, as well as siloxanes, such as, hexa-2-ethylbutoxydisiloxane, and the like.

Viscosity modifiers that will reduce viscosity without adversely effecting the properties of the hydraulic fluid, such as rubber swell and the like, can also be used in the practice of this invention as exemplified by glycol ethers, glycol ether carbonates, acetals, and esters.

The components of this invention can be blended by conventional mixing equipment known to those skilled in the art.

The invention is further described in the examples which follow. All parts and percentages are by weight unless otherwise specified.

EXAMPLE 1

A total of 1665.84 grams (8 mols) of $CH_3(OCH_2CH_2)_4OH$, 247.2 grams (4 mols) of ortho-boric acid and 800 ml. of toluene were mixed together in a 5 liter, round-bottom, 3-neck flask equipped with an air stirrer. A nitrogen purge was employed. While heating at reflux temperature and stirring, the water of condensation was removed as an azeotrope. When 144 ml. (8 moles) of water was separated from the reaction mixture, the reaction mixture containing the intermediate boric acid ester having the formula

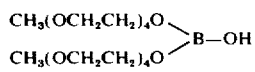

was allowed to cool below the reflux temperature. 776.2 Grams (4 mols) of Tetraethylene Glycol, $H(OCH_2CH_2)_4OH$, was introduced and the reaction mixture was stirred and reheated to reflux temperature (110°–120°C.). After 72 grams (4 mols) of water had been removed, the toluene was distilled from the reaction mixture and the residue containing the product was vacuum stripped at a pressure of 2–4 mm. at a temperature of 120°–150°C. A total of 2470 grams of boric acid ester product was recovered (essentially 100% of theory), the boric acid ester exhibited a viscosity of $-40°C$. of 32,000 centistokes. The boric acid ester thus obtained is represented by the formula below.

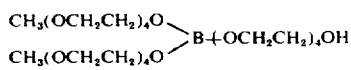

The rubber swell of standard styrene-butadiene rubber test cups exposed to this ester measured in conformity with Federal Motor Vehicle Safety Standard No. 116 Paragraph S 4.1.13 was 0.005 inches.

EXAMPLE 2

Example 1 was repeated with the exception that methyl Carbitol (trademark for the monomethyl ether of diethylene glycol) was used in place of the $CH_3(OCH_2CH_2)_4OH$. The boric acid ester thus obtained is represented by the formula below.

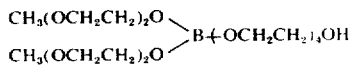

The rubber swell of this ester measured as in Example 1 was 0.007 inches.

CONTROL A

Example 1 was repeated with the exception that the tetraethylene glycol was replaced by an equimolar amount of $CH_3(OCH_2CH_2)_4OH$. The boric acid ester thus obtained is represented by the formula below.

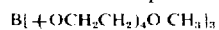

The rubber swell of this ester measured as in Example 1 was 0.017 inches.

CONTROL B

Example 1 was repeated with the exception that the $CH_3(OCH_2CH_2)_4OH$ and the tetraethylene glycol were replaced with an equimolar amount of methyl Carbitol. The boric acid ester thus obtained is represented by the formula below.

The rubber swell of this ester measured as in Example 1 was 0.085 inches.

EXAMPLE 3

A test brake fluid was formulated by blending 50% by weight of the boric acid ester prepared in Example 1 together with 30% by weight of methoxy triglycol $CH_3(OCH_2CH_2)_3OH$ and 20% by weight of butyl Carbitol (the mono butyl ester of diethylene glycol, a trademark of Union Carbide Corporation). This mixture after the addition of 4% by weight of water exhibited a wet equilibrium reflux boiling point of 338°F. (169°C.) and a viscosity at $-40°C$. before addition of water of 1209 centistokes. The evaporation test, described in Motor Vehicle Safety Standard 116 Specification showed a percent residue of 43%. The appearance of the test brake fluid after addition of 5% water was clear.

EXAMPLE 4

A test brake fluid was formulated by blending 50% by weight of the boric acid ester prepared in Example 2 together with 30% by weight of methoxy triglycol and 20% by weight of butyl Carbitol. The viscosity at $-40°C$. was 884 centistokes. The Federal Specification evaporation test afforded a residue of 26.3 percent by weight. The wet equilibrium reflux boiling point after 4.0% water was added to this test fluid was 320°F. (160°C.). The appearance of the test fluid after addition of 5% by weight of water was clear.

Although the invention has been described in its preferred forms, with a certain degree of particularity, it is understood that the present disclosure has been made only by way of example, and that numerous changes can be made without departing from the spirit and the scope of the invention.

What is claimed is:

1. Hydraulic fluid consisting essentially of:
   1. about 2 to about 100% by weight of a borate ester having the formula:

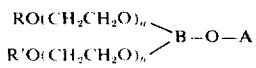

wherein each of $a$ and $b$ is an integer having values of 2 to 4, each of R and R' is an alkyl group having 1 to 4 carbon atoms, and A is an oxyalkylene unit, including mixed oxyalkylene units, having the formula:

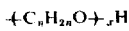

wherein $n$ is an integer having values of 2 to 5 and $x$ is an integer having values of 1 to 5;

2. 0 to about 62% by weight of a monoalkoxy trialkylene glycol having the formula:

wherein $R'''$ is an alkyl group having 1 to 4 carbon atoms and $R''$ is H or $-CH_3$; and 3. 0 to about 36% by weight of a monoalkyl ether of diethylene glycol wherein the alkyl group contains 1 to about 4 carbon atoms.

2. Hydraulic fluid claimed in claim 1 wherein $a$ and $b$ are each 4.

3. Hydraulic fluid claimed in claim 1 wherein $a$ and $b$ are each 2.

4. Hydraulic fluid claimed in claim 2 wherein $n$ is 2 and $x$ is 4.

5. Hydraulic fluid claimed in claim 3 wherein $n$ is 2 and $x$ is 4.

6. Hydraulic fluid claimed in claim 1 wherein the amount of boric acid ester is about 30 to about 60% by weight.

* * * * *